UNITED STATES PATENT OFFICE 2,517,684

KETONES BY CATALYTIC REACTION OF OLEFINS WITH ALDEHYDES

Elbert C. Ladd, Passaic, N. J., assignor to United States Rubber Company, New York, N. Y., a corporation of New Jersey No Drawing. Application March 13, 1947, Serial No. 734,537

1 Claim. (Cl. 260—597)

This invention relates to improvements in the preparation of ketones.

Ethylene, which as is known may be homopolymerized in the presence of peroxygen-type catalysts to high molecular weight polymers, will also react with saturated aldehydes in the presence of peroxygen-type catalysts, according to U. S. Patent 2,402,137, to give compounds in which the mole ratio of ethylene to aldehyde is upwards of 20 to 1 and may be over 50 to 1. I have found that certain unsaturated hydrocarbons which are not homopolymerizable to high molecular weight compounds in the presence of peroxygen-type catalysts will react with certain aldehydes in the presence of materials which will decompose to give free radicals to form low molecular weight ketones.

According to the present invention, certain unsaturated non-aromatic hydrocarbons, namely, alkenes containing at least three carbon atoms, cycloalkenes, or diolefines with isolated double bonds (i. e. diolefines free from consecutive,

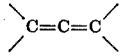

and conjugated,

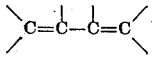

double bonds) are reacted with certain functionally aliphatic aldehydes, namely, n-alkanals, secalkanals, cycloalkanecarboxaldehydes and aralkanals in the presence of a catalytic material which will decompose to give free radicals, to form ketones of the formula R—CO—(X)$_n$—H, where R is the n-alkyl, secalkyl, cycloalkyl or aralkyl radical of the aldehyde reactant and X is the divalent radical derived from the unsaturated hydrocarbon reactant, and $n$ is an integer from 1 to 4.

The process of my invention is carried out by reacting a mixture of the aldehyde, the unsaturated hydrocarbon and the catalytic material, in the presence or absence of an inert diluent such as n-hexane, cyclohexane or benzene, the temperature employed being sufficient to effect decomposition of the catalyst with consequent production of free radicals. Examples of the aldehydes suitable for the process of my invention are acetaldehyde, propionaldehyde, butyraldehyde, isobutyraldehyde, heptaldehyde, octaldehyde, cyclopentanecarboxaldehyde, cyclohexanecarboxaldehyde, phenylacetaldehyde. Examples of the unsaturated hydrocarbons suitable for the process of my invention are propylene, butene-1, butene-2, isobutylene, amylene, hexene, heptene, octene, nonene, decene, dodecene, cyclopentene, cyclohexene, 4-vinylcyclohexene, pinene, 1,5-hexadiene, 2,5-dimethyl-1,5-hexadiene. The unsaturated hydrocarbons having a terminal methylene group, i. e., a $CH_2=C<$ group, such as the 1-alkenes are preferred, since these are somewhat more reactive in the process of my invention than the unsaturated hydrocarbons which do not have a terminal methylene group, for example, the 2-alkenes. The latter often require longer reaction times and higher temperatures to secure a satisfactory yield of the desired ketone than those which contain a terminal methylene group. Examples of catalysts suitable for the process of my invention which will decompose to give free radicals are peroxygentype catalysts, viz.: organic peroxides, e. g., acyl peroxides such as diacetyl peroxide, dibenzoyl peroxide, acetyl benzoyl peroxide, and alkyl peroxides, such as tertiary-butyl hydroperoxide; hydrogen peroxide; per-salts, e. g. alkali persulfates, alkali perborates, alkali percarbonates; hydrazine derivatives, e. g., hydrazine sulfate, hydrazine hydrochloride, dibenzoyl hydrazine; organo-metallic compounds which decompose thermally to give free radicals, e. g., tetraethyl lead. The type of catalysts exemplified above which will decompose to give free radicals are well known and should not be confused with Friedel-Crafts type catalysts, such as aluminum chloride, boron trifluoride, and acids such as sulfuric and hydrofluoric acids, which are not effective in the present process to give the liquid low molecular weight ketones of the present invention. Conversely, as known, the catalysts used in the process of the present invention are not effective as catalysts in Friedel-Crafts reactions. The organic peroxides are the present preferred catalysts for the process of this invention.

The amounts of the aldehyde and unsaturated hydrocarbon reactants may be varied over a considerable range upwards of 0.3 mol of aldehyde per mol of unsaturated hydrocarbon, but it is preferable to employ 1 to 20 mols of aldehyde per mol of unsaturated hydrocarbon. The amount of catalyst employed is not critical, generally 0.5 to 15 mol percent of the unsaturated hydrocarbon reactant being satisfactory. The temperature of the reaction may vary over a wide range depending particularly on the catalyst used which must be decomposed under the reaction conditions to produce free radicals. For practical purposes, reaction temperatures of about 25° C. to 150° C., and preferably in the range of 65° C. to 100° C., particularly for organic peroxide catalysts, have proven satisfactory. With liquid unsaturated hydrocarbon reactants, atmospheric pressure is satisfactory, while elevated pressures up to 2000 pounds per square inch or more are preferred with unsaturated hydrocarbons which are gaseous at room temperature (25° C.) and atmospheric pressure. The reaction is carried out until a substantial amount of the reactants has been converted to the ketone products. While the length of time that the reaction is allowed to proceed naturally depends on various factors such as the temperatures and pressures used, the reactants and catalyst employed, and the acceptable yield of ketone produced, generally the time of reaction may be from 1 to 50 or more hours. The ketone products may be isolated from the reaction mixture by removal of the unreacted starting materials and fractional distillation of the residue. In the case of the very high boiling products, however, fractional crystallization of the residue may prove to be more convenient.

The following examples are illustrative of the invention, all parts being by weight:

Example I

A mixture of 160 parts of propylene, 500 parts of acetaldehyde and 26.7 parts of dibenzoyl peroxide was heated in an autoclave of 1200 ml. capacity for 45 hours at about 70° C. The reaction mixture was then cooled to room temperature and the unreacted propylene was vented. The reaction mixture was washed with 10% aqueous sodium carbonate solution to remove acidic residues arising through the decomposition of the peroxide, and after drying it was fractionally distilled to yield 33 parts of methyl propyl ketone, B. Pt. 46° C./65 mm.; and 11 parts of a methyl hexyl ketone boiling in the range 68–73° C./45 mm.; $n_D^{20}=1.4170$; (Analysis.—Found: N, 22.20%; theory: N, 22.69%). The identities of the methyl propyl ketone and methyl hexyl ketone were confirmed by their semi-carbazone derivatives which melted at 108–109° C. and 100–101° C., respectively.

Example II

In a 1200 ml. pressure vessel, 85 parts of isobutylene were heated together with 705 parts of n-butyraldehyde and 9.7 parts of dibenzoyl peroxide at 70° C. for 45 hours. The product was isolated and purified as in Example I to yield 56 parts of propyl isobutyl ketone. Analysis.—Found: C, 74.6%; H, 12.0%; theory: C, 75.0%; H, 12.5%. Semi-carbazone derivative, M. Pt. 124° C.

Example III

Five hundred parts of acetaldehyde were admixed with 314 parts of octene-1 and 20.3 parts of dibenzoyl peroxide, and the mixture was heated in a pressure vessel at 70° C. for 48 hours. After washing and drying the reaction mixture, fractional distillation yielded 70 parts of methyl octyl ketone, B. Pt. 68–70° C./4 mm. Analysis.—Found: C, 57.03%; H, 7.35%; theory: C, 57.2%; H, 7.15%. Semi-carbazone derivative, M. Pt. 124–5° C.; 2,4-dinitrophenyl hydrazone derivative, M. Pt. 75° C. A minor amount of a higher-boiling ketone product was also obtained.

Example IV

A mixture of 180 parts of n-butyraldehyde and 89 parts of octene-1 were heated to reflux and 7.7 parts of dibenzoyl peroxide dissolved in 47.3 parts of butyraldehyde was added in five equal portions during the first 4 hours of the reaction. After heating for an additional 22 hours the reaction mixture was cooled, diluted with a small amount of diethyl ether, washed with aqueous sodium bicarbonate solution and dried. The solution was then evaporated under diminished pressure to remove solvent and unreacted starting materials, and the residue was fractionally distilled, yielding 62.1 parts of octyl propyl ketone, B. Pt. 102° C./6 mm.; $n_D^{20}=1.4320$; $d_4^{20}=0.8352$. Analysis.—Found: C, 78.5%; N, 13.06%; theory: C, 78.2%; H, 13.1%. From the above distillation are also obtained 19.6 parts of liquid residue containing higher-boiling ketone products.

Example V

A solution of 224 parts of octene-1 in 433 parts of isobutyraldehyde was heated to reflux and 10 parts of dibenzoyl peroxide were added. After heating for 15 hours an additional 10 parts of peroxide were added and heating was then continued for 27 more hours. The reaction mixture was purified as in Example IV to yield 5.1 parts of octyl isopropyl ketone, B. Pt. 92–95.8°C./6 mm.; $n_D^{20}=1.4338$; $d_4^{20}=0.8438$. Analysis.—Found: C, 77.36%; H, 12.78%; theory: C, 78.2%; H, 13.1%.

Example VI

To a mixture of 112 parts of octene-1 and 457 parts of n-heptaldehyde were added 10 parts of dibenzoyl peroxide, and reaction was effected by heating for 48 hours in the range of 75–85° C. Purification of the reaction mixture as in previous examples yielded 16 parts of octyl hexyl ketone, B. Pt. 95–99° C./0.1 mm. which upon recrystallization from 95% ethanol melted at 28–9° C. Analysis.—Found: C, 79.5%; H, 13.4%; theory: C, 79.5%; H, 13.3%.

Example VII

A mixture of 800 parts of n-heptaldehyde, 75 parts of propene and 12.1 parts of dibenzoyl peroxide were heated in a 1200 ml. pressure vessel for 42 hours at 70° C. The reaction product was purified in the manner of Example I to yield 21 parts of a dihexylketone boiling in the range 88–95° C./0.4 mm.; $n_D^{20}=1.4565$. 2,4-dinitrophenyl hydrazone derivative, M. Pt. 126–7° C.; Analysis.—Found: N, 14.78%; theory: N, 14.53%.

Example VIII

A mixture of 280.6 parts of decene-1 and 500 parts of acetaldehyde was reacted in the presence of 19.4 parts of dibenzoyl peroxide by heating in a pressure vessel at 70° C. for 48 hours. Purification of the reaction mixture yielded 100 parts of methyl decyl ketone (semi-carbazone derivative, M. Pt. 122–4° C.), and 22 parts of liquid residue containing a higher-boiling ketone.

Example IX

A mixture of 320 parts of dodecene-1, 500 parts of acetaldehyde and 13.8 parts of dibenzoyl peroxide was heated at 70° C. for 48 hours to yield 93 parts of methyl dodecyl ketone boiling in the range 104–118° C./1.7 mm. Semi-carbazone derivative, M. Pt. 125–7° C.; Analysis.—Found: N, 15.8%; theory: N, 15.64%.

Example X

A mixture of 82 parts of cyclohexene and 720 parts of n-butyraldehyde was heated for 48 hours at 76° C. with the addition of 18.2 parts of dibenzoyl peroxide in four equal portions during the first 32 hours of the reaction. A relatively small amount of cyclohexyl propyl ketone was obtained together with unreacted starting materials. The lower yield with cyclohexene as compared with the previous examples is characteristic of the unsaturated hydrocarbons containing only non-terminal unsaturated linkages and has likewise been observed in the case of isomers of a number of the alkenes employed in previous examples, e. g., butene-2 and octene-2.

The following examples disclose the use of polyolefinic hydrocarbons containing isolated double bonds and free from cumulated and conjugated double bonds in the process of our invention. It is noteworthy that even when a relatively large excess of aldehyde is present in the reaction mixture, the products are predominantly alkenyl ketones, i. e., only one of the olefinic linkages has reacted, and diketones are obtained in minor amounts if at all.

*Example XI*

A mixture of 45 parts of 1,5-hexadiene, 500 parts of acetaldehyde and 4.0 parts of dibenzoyl peroxide was heated for 48 hours at 70° C. in a pressure vessel. The usual purification of the product yielded 10 parts of the hexenyl methyl ketone boiling in the range 65–70° C./14 mm.;

$\eta_D^{20}=1.4313$; sp. g. $_{20}^{20}=0.8553$

Analysis.—Found: C, 75.18%; H, 10.66%; theory: C, 76.13%; H, 11.18%. 2,4-dinitrophenylhydrazone derivative, M. Pt. 60–1° C.; Analysis.— Found: N, 18.33%; theory: N, 18.30%. The liquid residue from the above distillation contained a small amount of a higher-boiling ketonic product.

*Example XII*

A mixture of 108 parts of 4-vinylcyclohexene and 288 parts of n-butyraldehyde was heated at 75° C. and 9.7 parts of dibenzoyl peroxide was added in 4 equal portions during the first 19 hours of the reaction. After heating for an additional 6 hours, the reaction mixture was cooled and purified to yield 37 parts of the propylcyclohexenyl ethyl ketone boiling in the range 100–105° C./6 mm.; $\eta_D^{20}=1.4759$.

In view of the many changes and modifications that may be made without departing from the principles underlying the invention, reference should be made to the appended claim for an understanding of the protection afforded the invention.

Having thus described my invention, what I claim and desire to protect by Letters Patent is:

The process of making propyl isobutyl ketone which consists in heating isobutylene and n-butyraldehyde in relative proportions corresponding to a molar ratio of n-butyraldehyde to isobutylene of approximately 6.5:1 in the presence of dibenzoyl peroxide at 70° C. for 45 hours, and isolating propyl isobutyl ketone from the resulting reaction mixture.

ELBERT C. LADD.

REFERENCES CITED

The following references are of record in the file of this patent:

UNITED STATES PATENTS

| Number | Name | Date |
|--------|------|------|
| 1,933,716 | Day | Nov. 7, 1933 |
| 2,178,523 | Schmidt et al. | Oct. 31, 1938 |
| 2,373,561 | Hanford | Apr. 10, 1945 |
| 2,391,218 | Bacon et al. | Dec. 18, 1945 |
| 2,402,137 | Hanford et al. | June 18, 1946 |
| 2,432,287 | Cramer | Dec. 9, 1947 |
| 2,440,800 | Hanford | May 4, 1948 |

OTHER REFERENCES

Paterno et al., Chemical Abstracts, vol. 5, pages 681–682 (1911).